United States Patent
Nakashima et al.

(10) Patent No.: US 8,003,206 B2
(45) Date of Patent: *Aug. 23, 2011

(54) OPTICAL LAMINATE

(75) Inventors: Masataka Nakashima, Tokyo-To (JP); Takeshi Hirai, Tokyo-To (JP); Norinaga Nakamura, Tokyo-To (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 983 days.

This patent is subject to a terminal disclaimer.

(21) Appl. No.: 11/233,354

(22) Filed: Sep. 22, 2005

(65) Prior Publication Data

US 2006/0134430 A1  Jun. 22, 2006

(30) Foreign Application Priority Data

Sep. 30, 2004   (JP) ................................. 2004-287013

(51) Int. Cl.
  *B32B 5/00*   (2006.01)
  *B32B 7/00*   (2006.01)
  *B32B 23/04*  (2006.01)
(52) U.S. Cl. ...................... 428/337; 428/411.1; 428/532
(58) Field of Classification Search .................. None
   See application file for complete search history.

(56) References Cited

U.S. PATENT DOCUMENTS

| 6,710,923 B2* | 3/2004 | Ito ................................. 359/599 |
| 2006/0134426 A1* | 6/2006 | Horio et al. ................ 428/411.1 |
| 2006/0134427 A1* | 6/2006 | Horio et al. ................ 428/411.1 |
| 2006/0134428 A1* | 6/2006 | Miyazaki et al. .......... 428/411.1 |
| 2006/0216497 A1* | 9/2006 | Torikoshi et al. ............ 428/323 |
| 2008/0268215 A1* | 10/2008 | Hattori et al. ................ 428/212 |

FOREIGN PATENT DOCUMENTS

| JP | 2001-183528 | | 7/2001 |
| JP | 2003205563 A | * | 7/2003 |
| JP | 2004-094007 | | 3/2004 |
| JP | 2004163752 A | * | 6/2004 |

* cited by examiner

*Primary Examiner* — Monique R Jackson
(74) *Attorney, Agent, or Firm* — Burr & Brown (57) ABSTRACT

An optical laminate is provided, which prevents the occurrence of interface reflection and interference fringes at the interface between a light transparent base material and an antistatic layer has been effectively prevented. The optical laminate includes a light transparent base material and an antistatic layer and a hardcoat layer provided in that order on the light transparent base material. The hardcoat layer is formed on the antistatic layer using a composition for a hardcoat layer including a resin and a penetrative solvent. The penetrative solvent penetrates into the antistatic layer and the light transparent base material so that the antistatic agent contained in the antistatic layer disperses into the antistatic layer or the light transparent base material.

9 Claims, 4 Drawing Sheets

OPTICAL LAMINATE

RELATED APPLICATION

The present application is a patent application claiming priority based on Japanese Patent Application No. 287013/2004 under the Paris Convention, and, thus, the disclosure thereof is totally incorporated herein.

TECHNICAL FIELD

The present invention relates to an optical laminate in which the occurrence of interface reflection and interference fringes have been prevented.

BACKGROUND ART

Display surfaces in image display devices such as liquid crystal displays (LCDs) or cathode ray tube display devices (CRTs) are required to reduce the reflection of light emitted from an external light source such as a fluorescent lamp and thus to enhance the visibility of the image. To meet this demand, an optical laminate (for example, an antireflective laminate) comprising a transparent object and a transparent film having a low refractive index covering the surface of the transparent object for lowering the reflectance has been provided to reduce the reflection from the display surface of the image display device and thus to improve the visibility.

For example, from the viewpoint of contamination resistance of display face of an image display device, an antistatic layer is often provided in an optical laminate. For example, Japanese Patent Laid-Open No. 94007/2004 proposes an antireflective optical laminate comprising a light transparent base material and an antistatic layer and a hardcoat layer provided in that order smoothly on the surface of the light transparent base material.

In the antireflective laminate comprising layers having a large refractive index difference stacked on a light transparent base material, however, interface reflection and interference fringes often occur at an interface of mutually superimposed layers. In particular, it is pointed out that, at the interface between the light transparent base material and the antistatic layer, interference fringes occur resulting in deteriorated visibility of images.

On the other hand, the present inventors have produced an optical laminate comprising an antistatic layer in a concave-convex form and have examined optical properties of the optical laminate. As a result, it was found that the haze value of the optical laminate is somewhat increased although interference fringes can be effectively prevented. Further, although interference fringes can be prevented, in an optical laminate comprising a hardcoat layer having a proper thickness (0.8 to 20 µm) provided on concaves and convexes in the antistatic layer, optical concave-convex deformation attributable to the antistatic layer sometimes stays on the outermost surface. For this reason, it was found that, in general, flattening of the outermost surface of the optical laminate as a final form approximately to a level of the outermost surface of an optical laminate in which only a hardcoat layer has been stacked, is very difficult. As a result, it was confirmed that, when an optical laminate comprising an antistatic layer having concaves and convexes is incorporated in an image display device, passage of transmitted light from within the device through the nonflat outermost surface causes shining dazzling derived from the optical concave-convex deformation.

Further, imparting concaves and convexes in the antistatic layer requires a multi-stage process and further requires an apparatus or the like for concaves and convexes. This poses a problem such as increased production cost. The above various problems can be solved by the formation of proper concaves and convexes in curing the composition for an antistatic layer.

Further, since the antistatic layer is generally provided between a light transparent base material and a hardcoat layer, in general, the antistatic agent in the antistatic layer is in a densely aggregated state. That is, when the antistatic agent is in the form of ultrafine particles which are present discretely or as aggregates, the fine particles or aggregates per se should be in contact with each other in any site. On the other hand, when the antistatic agent is an organic electrically conductive composition, the formation of a film of a homogeneous antistatic layer is necessary for the development of antistatic properties.

So far as the present inventors know, however, up to now, any optical laminate comprising an antistatic layer has not been proposed in which the presence of an antistatic agent in an antistatic layer in a satisfactorily dispersed state without being aggregated in the layer while maintaining the antistatic properties, or alternatively the formation of the antistatic agent as a cracked heterogeneous film rather than a homogeneous film on one side of an antistatic layer in which an organic electrically conductive composition as an antistatic agent is imparted and formed, can effectively prevent interface reflection and interference fringes at the interface between the antistatic layer and the light transparent base material, can realize flattening as in an optical laminate in which only a hardcoat layer is provided without any antistatic layer on the outermost surface, and can eliminate dazzling, a problem involved in the image display screen.

SUMMARY OF THE INVENTION

At the time of the present invention, the present inventors have found that the presence of an antistatic agent (electrically conductive fine particles) in an antistatic layer in a satisfactorily dispersed state without being aggregated in the layer while maintaining the antistatic properties, or alternatively the formation of the antistatic agent as a cracked heterogeneous film rather than a homogeneous film while maintaining the antistatic properties on one side of a layer in which an organic electrically conductive composition as an antistatic agent is coated, can substantially eliminate the interface between the light transparent base material and the antistatic layer, resulting in effective prevention of the occurrence of interface reflection and interference fringes in each interface. Accordingly, the present invention is to provide an optical laminate, which is mechanically strong and has excellent antireflective function and visibility, by aiming at the interface between the light transparent base material and the antistatic layer and substantially eliminating the interface.

According to the present invention, there is provided an optical laminate comprising a light transparent base material; and an antistatic layer, and a hardcoat layer provided in that order on said light transparent base material, wherein said hardcoat layer comprising a composition for a hardcoat layer comprising a resin and a penetrative solvent is provided on the antistatic layer, and said penetrative solvent penetrates into said antistatic layer and said light transparent base material so that an antistatic agent contained in the antistatic layer disperses into said antistatic layer or said light transparent base material.

In a preferred embodiment of the present invention, in the optical laminate, said penetrative solvent penetrates into said antistatic layer and said light transparent base material to form the antistatic layer comprising an organic electrically conductive composition, as a cracked heterogeneous film.

According to another aspect of the present invention, there is provided an optical laminate comprising a light transparent base material; and an antistatic layer, and a hardcoat layer provided in that order on said light transparent base material, wherein said hardcoat layer comprising a composition for a hardcoat layer comprising a resin and a penetrative solvent is provided on the antistatic layer, and said penetrative solvent penetrates into said antistatic layer so that said antistatic layer swells therein or fine cracks appears within said antistatic layer.

DETAILED DESCRIPTION OF THE INVENTION

1. Optical Laminate

Figure 1:
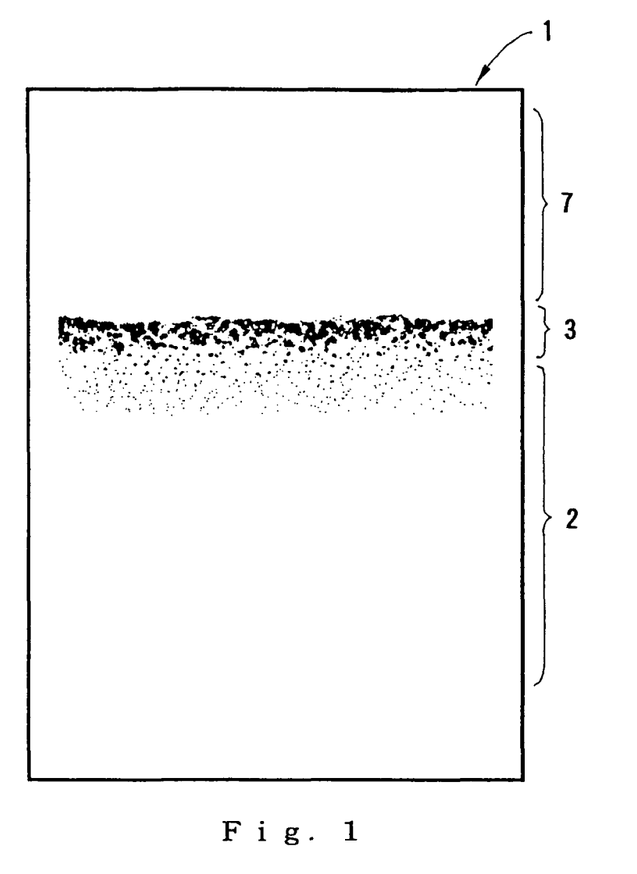
FIG. 1 is a cross-sectional view of an optical laminate according to the present invention.

The optical laminate according to the present invention will be described with reference to the accompanying drawings. FIG. 1 is a cross-sectional view of an optical laminate 1 according to the present invention as measured with TEM. From FIG. 1, it is understood that an antistatic layer 3 is provided on a light transparent base material 2 and antistatic agents present in the antistatic layer 3 are not mutually aggregate but are present in a dispersed state. A hardcoat layer 7 is provided on this antistatic layer 3. Due to the action of the penetrative solvent, the antistatic layer was swollen, or fine cracks was formed in the inside of the antistatic layer.

Figure 2:
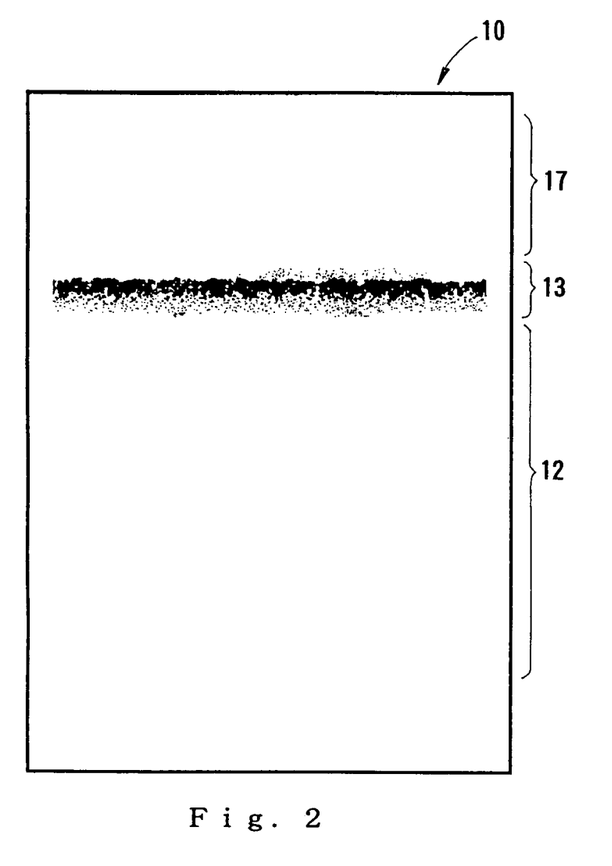
FIG. 2 is a cross-sectional view of a conventional optical laminate.

The optical laminate shown in FIG. 1 will be compared with a conventional optical laminate 10 shown in FIG. 2 (a cross-sectional view as measured with TEM). The layer construction of the optical laminate 10 shown in FIG. 2 is identical to the layer construction of the optical laminate 1 according to the present invention in that an antistatic layer 13 is provided on a light transparent base material 12 and a hardcoat layer 17 is provided on the antistatic layer 13. However, it should be noted that, in FIG. 2, antistatic agents in the antistatic layer 13 are mutually densely aggregated. Therefore, it is understood that the optical laminate 1 according to the present invention and the conventional optical laminate 10 are different from each other in the state of the antistatic agent in the antistatic layer.

In the optical laminate according to the present invention, the mechanism of the formation of the antistatic layer shown in FIG. 1 is believed to be such that, in forming the hardcoat layer 7 on the antistatic layer 3 using a composition for a hardcoat layer comprising a resin and a penetrative solvent, the penetrative solvent and a mixture of the penetrative solvent with the hardcoating resin penetrate into the antistatic layer and the light transparent base material. That is, it is considered that, upon coating of the composition for a hardcoat layer on an antistatic layer, the penetrative solvent and the hardcoating resin penetrate into or wet the antistatic layer and the light transparent base material and thus to form a blend of the antistatic layer with the light transparent base material, whereby the antistatic agent is dispersed without being aggregated. Further, it is considered that the penetrative solvent penetrates into the antistatic layer and the light transparent base material and consequently causes swelling of the antistatic layer or microcracks in the inside of the antistatic layer. Further, it is considered that the antistatic agents are dispersed without being aggregated.

When the antistatic layer is formed using an organic electrically conductive composition as an antistatic agent (FIGS. 3 and 4), as with the above case, upon the application of the composition for a hardcoat layer containing a hardcoating resin and a penetrative solvent, the penetrative solvent contained in the composition first penetrates into the antistatic layer and the light transparent base material. As a result, the antistatic layer which, together with the light transparent base material, has formed a homogeneous film, is swollen, and microcracks begin to occur in the inside of the antistatic layer. Next, it is considered that the hardcoating resin, together with the solvent contained in the composition for a hardcoat layer, begins to penetrate into the antistatic layer and the light transparent base material and, consequently, microcracks formed in the antistatic layer are further increased to render the antistatic layer in a homogeneous film form heterogeneous and, further, a part of a blend of the antistatic layer with the base material in such a state that the polymer in the organic electrically conductive composition has been dispersed in the base material, is formed between the antistatic layer and the base material.

In a preferred embodiment of the present invention, the antistatic layer is formed using a composition for an antistatic layer containing a penetrative solvent penetrative into the light transparent base material. It is considered that the penetration of the penetrative solvent into the light transparent base material results in the formation of a blend of the antistatic layer with the light transparent base material and, consequently, the dispersion of the antistatic agent is promoted without aggregation of the antistatic agent. It is also considered that the penetrative solvent swells the light transparent base material to form microcracks in the inside of the antistatic layer. Also when the antistatic agent is an organic electrically conductive composition, it is considered that the incorporation of the penetrative solvent in the composition leads to the penetration of the penetrative solvent into the light transparent base material which causes swelling of the base material and consequently causes microcracking in the antistatic layer as a homogeneous film, resulting in further acceleration of the heterogenization of the antistatic layer.

It should be noted that the above matter is hypothetical and the mechanism has not been fully elucidated yet. In FIG. 1, for easy understanding of the laminate structure of the optical laminate according to the present invention, the light transparent base material 2, the antistatic layer 3, and the hardcoat layer 7 are shown so that they are separated from each other. In fact, however, the interface between the layers cannot be clearly distinguished.

1) Hardcoat Layer

The term "hardcoat layer" as used herein refers to a coat layer having a hardness of "H" or more in a pencil hardness test specified in JIS 5600-5-4 (1999). The thickness of the hardcoat layer (on a cured state basis) is preferably in the range of 0.1 to 100 μm, more preferably in the range of 0.8 to 20 μm. The hardcoat layer comprises a resin, a solvent, a penetrative solvent (preferably), and optional components. The solvent may be the same as that described above in connection with the antistatic layer.

Penetrative Solvent

A solvent penetrative into the light transparent base material and the antistatic layer is used as the penetrative solvent. Accordingly, in the present invention, the term "penetrative" used in conjunction with the penetrative solvent embraces all concepts of penetrating properties, swelling properties, wetting properties and the like with respect to the light transparent base material. Specific examples of penetrative solvents include alcohols such as isopropyl alcohol, methanol, and ethanol; ketones such as methyl ethyl ketone, methyl isobutyl ketone, and cyclohexanone; esters such as methyl acetate, ethyl acetate, and butyl acetate; halogenated hydrocarbons; aromatic hydrocarbons such as toluene and xylene; or mixture thereof.

Specific examples of penetrative solvents include acetone, methyl acetate, ethyl acetate, butyl acetate, chloroform, methylene chloride, trichloroethane, tetrahydrofuran, methyl ethyl ketone, methylisobutyl ketone, cyclohexanone, nitromethane, 1,4-dioxane, dioxolane, N-methylpyrrolidone, N,N-dimethylformamide, methanol, ethanol, isopropyl alcohol, butanol, isobutyl alcohol, diisopropyl ether, methyl cellosolve, ethyl cellosolve, and butyl cellosolve. Preferred are methyl acetate, ethyl acetate, butyl acetate, methyl ethyl ketone and the like.

When a penetrative solvent is added to the composition for a hardcoat layer, the amount of the penetrative solvent added is not less than 50% by weight and not more than 100% by weight based on the total weight of the solvent in the composition for a hardcoat layer. The solid content of the composition for a hardcoat layer is preferably not less than 10% by weight and not more than 70% by weight, more preferably not less than 40% by weight and not more than 50% by weight, from the viewpoint of proper processing.

Resin

The resin is preferably transparent, and specific examples thereof include four types of resins, that is, ionizing radiation curing resins curable upon exposure to ultraviolet light or electron beams, solvent drying-type resins (resins which is nonadhesive in a solvent-free state, such as resins comprising a polymer component), mixtures of ionizing radiation curing resins with solvent drying-type resins, and heat curing resins. Preferred are ionizing radiation curing resins.

Specific examples of ionizing radiation curing resins include acrylate functional group-containing resins, for example, relatively low-molecular weight polyester resins, polyether resins, acrylic resins, epoxy resins, urethane resins, alkyd resins, spiroacetal resins, polybutadiene resins, polythiolpolyene resins, oligomers or prepolymers of (meth)acrylates or the like of polyfunctional compounds such as polyhydric alcohols, and reactive diluents. Specific examples thereof include monofunctional monomers and polyfunctional monomers such as ethyl(meth)acrylate, ethylhexyl (meth)acrylate, styrene, methylstyrene, N-vinylpyrrolidone, for example, polymethylolpropane tri(meth)acrylate, hexanediol(meth)acrylate, tripropylene glycol di(meth)acrylate, diethylene glycol di(meth)acrylate, pentaerithritol tri(meth)acrylate, dipentaerithritol hexa(meth)acrylate, 1,6-hexanediol di(meth)acrylate, and neopentyl glycol di(meth)acrylate.

When an ionizing radiation curing resin is used as the ultraviolet curing resin, the use of a photopolymerization initiator is preferred. Specific examples of photopolymerization initiators include acetophenones, benzophenones, Michler's benzoyl benzoate, α-amyloxime ester, tetramethylthiuram monosulfide, and thioxanthones. Further, a photosensitizer is preferably mixed in the resin, and specific examples thereof include n-butylamine, triethylamine, and poly-n-butylphosphine.

The solvent drying-type resin used either as a mixture with the ionizing radiation curing resin or as such is mainly a thermoplastic resin. Generally exemplified thermoplastic resins may be used. The occurrence of coating film defects in the coating surface can be effectively prevented by adding the solvent drying-type resin. In a preferred embodiment of the present invention, when the material for the transparent base material is a cellulosic resin such as TAC, specific examples of preferred thermoplastic resins include cellulosic resins, for example, nitrocellulose resins, acetyl cellulose resins, cellulose acetate propionate resins, and ethylhydroxyethylcellulose resins.

Specific examples of heat curing resins include phenolic resins, urea resins, diallyl phthalate resins, melanin resins, guanamine resins, unsaturated polyester resins, polyurethane resins, epoxy resins, aminoalkyd resins, melamine-urea co-condensation resins, silicone resins, polysiloxane resins, and acrylic ester copolymer resins. When heat curing resins are used, if necessary, curing agents such as crosslinking agents and polymerization initiators, polymerization accelerators, solvents, viscosity modifiers and the like may also be added.

Optional Components

Polymerization Initiator

A photopolymerization initiator may be used in forming a hardcoat layer. Specific examples thereof include 1-hydroxy-cyclohexyl-phenyl-ketone. This compound is commercially available, for example, under the tradename Irgacure 184 (manufactured by Ciba Specialty Chemicals, K.K.).

Antistatic Agent and/or Anti-Dazzling Agent

The hardcoat layer preferably comprises an antistatic agent and/or an anti-dazzling agent.

Antistatic Agent

The antistatic agent may be the same as that described in connection with an antistatic layer which will be described later.

Anti-Dazzling Agent

Fine particles may be mentioned as the anti-dazzling agent and may be in the form of sphere, ellipse and the like, preferably sphere. The fine particles may be either inorganic or organic type. The fine particles are preferably formed of an organic material. The fine particles exhibit anti-dazzling properties and are preferably transparent. Specific examples of fine particles include plastic beads, more preferably transparent plastic beads. Specific examples of plastic beads include styrene beads (refractive index 1.59), melamine beads (refractive index 1.57), acrylic beads (refractive index 1.49), acrylic-styrene beads (refractive index 1.54), polycarbonate beads, polyethylene beads and the like. The amount of the fine particles added is 2 to 30 parts by weight, preferably about 10 to 25 parts by weight, based on 100 parts by weight of the transparent resin composition.

Solvent

In forming the hardcoat layer, a composition for a hardcoat layer which is a mixture of the above components with a solvent is utilized. Specific examples of solvents include: alcohols such as isopropyl alcohol, methanol, and ethanol; ketones such as methyl ethyl ketone, methyl isobutyl ketone, and cyclohexanone; esters such as ethyl acetate and butyl acetate; halogenated hydrocarbons; aromatic hydrocarbons such as toluene and xylene; or mixtures thereof. Preferred are ketones and esters.

Formation of Hardcoat Layer

The hardcoat layer may be formed by mixing the above-described resin, solvent and optional components together to prepare a composition which is then coated onto a light transparent base material. In a preferred embodiment of the present invention, a leveling agent such as a fluoro or silicone leveling agent is added to the liquid composition. The liquid composition with a leveling agent added thereto can effectively prevent the inhibition of curing by oxygen on the coating film surface at the time of coating or drying and can impart scratch resistance.

The composition may be coated by a coating method such as roll coating, Mayer bar coating, or gravure coating. After coating of the liquid composition, drying and ultraviolet curing are carried out. Specific examples of ultraviolet light sources include ultrahigh pressure mercury lamps, high pressure mercury lamps, low pressure mercury lamps, carbon arc lamps, black light fluorescent lamps, and metal halide lamps. A wavelength region of 190 to 380 nm may be used as wavelengths of the ultraviolet light. Specific examples of electron beam sources include various electron beam accelerators, such as Cockcroft-Walton accelerators, van de Graaff accelerators, resonance transformers, insulated core transformers, linear, dynamitron, and high-frequency electron accelerators.

2) Antistatic Layer

The antistatic layer is formed using a liquid composition for an antistatic layer, comprising an antistatic agent and a resin. The thickness of the antistatic layer is preferably in the range of about 30 nm to 1 μm.

Penetrative Solvent

In a preferred embodiment of the present invention, the composition for an antistatic layer comprises a penetrative solvent. Specific examples of penetrative solvents may be the same as those described above in connection with the hardcoat layer. The amount of the penetrative solvent in the liquid composition for an antistatic layer is preferably not less than 0.1% and not more than 100% based on the total amount of the solvent in the composition for an antistatic layer from the viewpoint of penetrability. The solid content of the whole composition for an antistatic layer is preferably not less than 0.1% and not more than 50% from the viewpoint of coatability.

Antistatic Agent (Electrically Conductive Agent)

Specific examples of antistatic agents usable for antistatic layer formation include quaternary ammonium salts, pyridinium salts, various cationic compounds containing cationic groups such as primary to tertiary amino groups, anionic compounds containing anionic groups such as sulfonic acid bases, sulfuric ester bases, phosphoric ester bases, and phosphonic acid bases, amphoteric compounds such as amino acid and aminosulfuric acid ester compounds, nonionic compounds such as amino alcohol, glycerin, and polyethylene glycol compounds, organometal compounds such as alkoxides of tin and titanium, and metal chelate compounds such as their acetyl acetonate salts. Further, compounds prepared by increasing the molecular weight of the above exemplified compounds may also be mentioned. Furthermore, monomers or oligomers, which contain a tertiary amino group, a quaternary ammonium group, or a metal chelate part and is polymerizable by an ionizing radiation, or polymerizable compounds, for example, organometal compounds such as coupling agents containing a functional group(s) polymerizable by an ionizing radiation may also be used as the antistatic agent.

Electrically conductive ultrafine particles may also be mentioned. Specific examples of electrically conductive fine particles include fine particles of metal oxides. Such metal oxides include ZnO (refractive index 1.90; numerical value within the parentheses referred to hereinbelow being a refractive index value), $CeO_2$ (1.95), $Sb_2O_2$ (1.71), $SnO_2$ (1.997), indium tin oxide often abbreviated to ITO (1.95), $In_2O_3$ (2.00), $Al_2O_3$ (1.63), antimony doped tin oxide (abbreviation; ATO, 2.0), and aluminum doped zinc oxide (abbreviation; AZO, 2.0). Fine particles refer to particles having a size of not more than 1 micron, that is, the so-called submicron size, preferably having an average particle diameter of 0.1 nm to 0.1 μm. In a preferred embodiment of the present invention, for the fine particles, the primary particle diameter is about 30 to 70 nm, and the secondary particle diameter is preferably not more than about 200 nm.

Further, an organic electrically conductive composition may be utilized, and examples thereof include polymer-type electrically conductive compositions. In addition to the above organic compounds, for example, aliphatic conjugated polyacetylenes, aromatic conjugated poly(paraphenylenes), heterocyclic conjugated polypyrroles, polythiophene, heteroatom-containing conjugated polyanilines, and mixed type conjugated poly(phenylenevinylenes) may be mentioned. Further examples thereof include double-chain conjugated systems which are conjugated systems having a plurality of conjugated chains in the molecule thereof, and electrically conductive composites which are polymers prepared by grafting or block-copolymerizing the above conjugated polymer chain onto a saturated polymer.

Resin

Specific examples of resins usable herein include thermoplastic resins, heat curing resins, or ionizing radiation curing resins or ionizing radiation curing compounds (including organic reactive silicon compounds). Thermoplastic resins may be used as the resin. More preferably, heat curing resins are used. Still more preferred are ionizing radiation curing resins or ionizing radiation curing compound-containing ionizing radiation curing compositions.

The ionizing radiation curing composition is a composition prepared by properly mixing a prepolymer, oligomer and/or monomer containing a polymerizable unsaturated bond or epoxy group in its molecule together. The ionizing radiation refers to a radiation having an energy quantum which can polymerize or crosslink the molecule among electromagnetic waves or charged particle beams and is generally ultraviolet light or electron beams.

Examples of prepolymers and oligomers in the ionizing radiation curing composition include unsaturated polyesters such as condensates of unsaturated dicarboxylic acids and polyhydric alcohols, methacrylates such as polyester methacrylate, polyether methacrylate, polyol methacrylate, and melamine methacrylate, acrylates such as polyester acrylate, epoxy acrylate, urethane acrylate, polyether acrylate, polyol acrylate, and melamine acrylate, and cation polymerizable epoxy compounds.

Examples of monomers in the ionizing radiation curing composition include styrene monomers such as styrene and α-methyl styrene, acrylic esters such as methyl acrylate, 2-ethylhexyl acrylate, methoxyethyl acrylate, butoxyethyl acrylate, butyl acrylate, methoxybutyl acrylate, and phenylacrylate, methacrylic esters such as methyl methacrylate, ethyl methacrylate, propyl methacrylate, methoxyethyl methacrylate, ethoxymethyl methacrylate, phenyl methacrylate, and lauryl methacrylate, unsaturated substituted amino alcohol esters such as 2-(N,N-diethylamino)ethyl acrylate, 2-(N,N-dimethylamino)ethyl acrylate, 2-(N,N-dibenzylamino)methyl acrylate, and 2-(N,N-diethylamino)propyl acrylate, unsaturated carboxylic acid amides such as acrylamide and methacrylamide, compounds such as ethylene glycol diacrylate, propylene glycol diacrylate, neopentyl glycol diacrylate, 1,6-hexanediol diacrylate, and triethylene glycol diacrylate, polyfunctional compounds such as dipropylene glycol diacrylate, ethylene glycol diacrylate, propylene glycol dimethacrylate, and diethylene glycol dimethacrylate, and/or polythiol compounds containing two or more thiol groups in the molecule thereof, for example, trimethylolpropane trithioglycolate, trimethylolpropane trithiopropylate, and pentaerythritol tetrathioglycolate.

In general, if necessary, one or a mixture of at least two of the compounds described above is used as the monomer in the ionizing radiation curing composition. In order to impart ordinary coatability to the ionizing radiation curing composition, preferably, the content of the prepolymer or oligomer is brought to not less than 5% by weight, and the content of the monomer and/or polythiol compound is brought to not more than 95% by weight.

When flexibility is required of a film formed by coating the ionizing radiation curing composition and curing the coating, this requirement can be met by reducing the amount of the monomer or using an acrylate monomer having one or two functional groups. When abrasion resistance, heat resistance, and solvent resistance are required of a film formed by coating the ionizing radiation curing composition and curing the coating, this requirement can be met by tailoring the design of the ionizing radiation curing composition, for example, by using an acrylate monomer having three or more functional groups. Monofunctional acrylate monomers include 2-hydroxy acrylate, 2-hexyl acrylate, and phenoxyethyl acrylate. Difunctional acrylate monomers include ethylene glycol diacrylate and 1,6-hexanediol diacrylate. Tri- or higher functional acrylate monomers include trimethylolpropane triacrylate, pentaerythritol triacrylate, pentaerythritol tetraacrylate, and dipentaerythritol hexaacrylate.

In order to regulate properties such as flexibility or surface hardness of a film formed by coating the ionizing radiation curing composition and curing the coating, a resin not curable by ionizing radiation irradiation may also be added to the ionizing radiation curing composition. Specific examples of resins usable herein include thermoplastic resins such as polyurethane resins, cellulosic resins, polyvinyl butyral resins, polyester resins, acrylic resins, polyvinylchloride resins, and polyvinyl acetate. Among them, polyurethane resins, cellulosic resins, polyvinyl butyral resins and the like are preferably added from the viewpoint of improving the flexibility.

When curing after coating of the ionizing radiation curing composition is carried out by ultraviolet light irradiation, photopolymerization initiators or photopolymerization accelerators are added. In the case of radically polymerizable unsaturated group-containing resins, photopolymerization initiators usable herein include acetophenones, benzophenones, thioxanthones, benzoins, and benzoin methyl ethers. They may be used either solely or as a mixture of two or more. In the case of cationically polymerizable functional group-containing resins, photopolymerization initiators usable herein include aromatic diazonium salts, aromatic sulfonium salts, aromatic iodonium salts, metallocene compounds, benzoin sulfonates and the like. They may be used either solely or as a mixture of two or more. The amount of the photopolymerization initiator added is 0.1 to 10 parts by weight based on 100 parts by weight of the ionizing radiation curing composition.

The ionizing radiation curing composition may be used in combination with the following organic reactive silicon compound.

One of organic silicon compounds usable herein is represented by general formula $R_mSi(OR')_n$ wherein R and R' represent an alkyl group having 1 to 10 carbon atoms; and m as a subscript of R and n as a subscript of OR' each are an integer satisfying a relationship represented by $m+n=4$.

Specific examples thereof include tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-propoxysilane, tetrapenta-n-butoxysilane, tetrapenta-sec-butoxysilane, tetrapenta-tert-butoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, methyldimethoxysilane, methyldiethoxysilane, and hexyltrimethoxysilane.

Organic silicon compounds usable in combination with the ionizing radiation curing composition are silane coupling agents. Specific examples thereof include γ-(2-aminoethyl) aminopropyltrimethoxysilane, γ-(2-aminoethyl) aminopropylmethyldimethoxysilane, β-(3,4-epoxycyclohexyl) ethyltrimethoxysilane, γ-aminopropyltriethoxysilane, γ-methacryloxypropylmethoxysilane, N-β-(N-vinylbenzylaminoethyl)-γ-aminopropylmethoxysilane hydrochloride, γ-glycidoxypropyltrimethoxysilane, aminosilane, methylmethoxysilane, vinyltriacetoxysilane, γ-mercaptopropyltrimethoxysilane, γ-chloropropyltrimethoxysilane, hexamethyldisilazane, vinyl-tris(β-methoxyethoxy)silane, octadecyldimethyl[3-(trimethoxysilyl)propyl]ammonium chloride, methyltrichlorosilane, and dimethyldichlorosilane.

Formation of Antistatic Layer

A coating film as the antistatic layer may be formed by coating a composition comprising a mixture of an antistatic agent, a resin, and a solvent (which may be the same as that described above in connection with the hardcoat layer) by a coating method such as roll coating, Mayer bar coating, or gravure coating. After coating of this liquid composition, the coating is dried. In the case of the ionizing radiation curing resin, ultraviolet curing or electron beam curing is carried out. The ionizing radiation curing resin composition is cured by exposure to an electron beam or ultraviolet light. In the case of electron beam curing, for example, electron beams having an energy of 100 to 300 KeV are used. On the other hand, in the case of curing by ultraviolet light, for example, ultraviolet light generated from light sources such as ultrahigh pressure mercury lamps, high pressure mercury lamps, low pressure mercury lamps, carbon arc lamps, xenon arc lamps, and metal halide lamps is used. The antistatic layer is preferably formed so that the surface resistivity value of the antistatic layer is not more than $5 \times 10^7 \Omega/\square$.

3) Light Transparent Base Material

The light transparent base material is preferably transparent, smooth and resistant to heat and possesses excellent mechanical strength. Specific examples of materials for light transparent base material formation include thermoplastic resins such as polyester, cellulose triacetate, cellulose diacetate, cellulose acetate butyrate, polyester, polyamide, polyimide, polyether sulfone, polysulfone, polypropylene, polymethylpentene, polyvinyl chloride, polyvinyl acetal, polyether ketone, polymethyl methacrylate, polycarbonates, or polyurethane. Preferred are polyesters and cellulose triacetate.

The thickness of the light transparent base material is not less than 20 μm and not more than 300 μm. Preferably, the upper limit of the thickness of the light transparent base material is 200 μm, and the lower limit of the thickness is 30 μm. When the light transparent base material is in a plate form, the thickness of the plate may exceed this thickness. Further, when a layer having optical properties is formed on the light transparent base material, from the viewpoint of improving the adhesion, the light transparent base material may be previously subjected to physical treatment such as corona discharge treatment or oxidation treatment or subjected to coating with a coating material called an anchor agent or a primer.

4) Lower-Refractive Index Layer

In a preferred embodiment of the present invention, a lower-refractive index layer is formed on the hardcoat layer. The lower-refractive index layer may be formed of a thin film comprising a silica- or magnesium fluoride-containing resin, a fluororesin as a lower-refractive index resin, or a silica- or magnesium fluoride-containing fluororesin and having a refractive index of not more than 1.46 and a thickness of about 30 nm to 1 μm, or a thin film formed by chemical deposition or physical deposition of silica or magnesium fluoride. Resins other than the fluororesin are the same as used for constituting the antistatic layer.

More preferably, the lower-refractive index layer is formed of a silicone-containing vinylidene fluoride copolymer. Specifically, this silicone-containing vinylidene fluoride copolymer comprises a resin composition comprising 100 parts of a fluorocopolymer prepared by copolymerization using, as a starting material, a monomer composition containing 30 to 90% (all the percentages being by mass; the same shall apply hereinafter) of vinylidene fluoride and 5 to 50% of hexafluoropropylene, and having a fluorine content of 60 to 70% and 80 to 150 parts of an ethylenically unsaturated group-containing polymerizable compound. This resin composition is used to form a lower-refractive index layer having a refractive index of less than 1.60 (preferably not more than 1.46) which is a thin film having a thickness of not more than 200 nm and to which scratch resistance has been imparted.

For the silicone-containing vinylidene fluoride copolymer constituting the lower-refractive index layer, the content of individual components in the monomer composition is 30 to 90%, preferably 40 to 80%, particularly preferably 40 to 70%, for vinylidene fluoride, and 5 to 50%, preferably 10 to 50%, particularly preferably 15 to 45%, for hexafluoropropylene. This monomer composition may further comprise 0 to 40%, preferably 0 to 35%, particularly preferably 10 to 30%, of tetrafluoroethylene.

The above monomer composition may comprise other comonomer component in such an amount that is not detrimental to the purpose of use and effect of the silicone-containing vinylidene fluoride copolymer, for example, in an amount of not more than 20%, preferably not more than 10%. Specific examples of other comonomer components include fluorine atom-containing polymerizable monomers such as fluoroethylene, trifluoroethylene, chlorotrifluoroethylene, 1,2-dichloro-1,2-difluoroethylene, 2-bromo-3,3,3-trifluoroethylene, 3-bromo-3,3-difluoropropylene, 3,3,3-trifluoropropylene, 1,1,2-trichloro-3,3,3-trifluoropropylene, and α-trifluoromethacrylic acid.

The fluorocopolymer produced from this monomer composition should have a fluorine content of 60 to 70%, preferably 62 to 70%, particularly preferably 64 to 68%. When the fluorine content is in the above-defined specific range, the fluoropolymer has good solubility in solvents. The incorporation of the above fluoropolymer as a component can result in the formation of a thin film which has excellent adhesion to various base materials, has a high level of transparency and a low level of refractive index and, at the same time, has satisfactorily high mechanical strength. Therefore, the surface with the thin film formed thereon has a satisfactorily high level of mechanical properties such as scratch resistance which is very advantageous.

Preferably, the molecular weight of the fluorocopolymer is 5,000 to 200,000, particularly preferably 10,000 to 100,000, in terms of number average molecular weight as determined using polystyrene as a standard. When the fluorocopolymer having this molecular weight is used, the fluororesin composition has suitable viscosity and thus reliably has suitable coatability. The refractive index of the fluorocopolymer per se is preferably not more than 1.45, particularly preferably not more than 1.42, still more preferably not more than 1.40. When a fluorocopolymer having a refractive index exceeding 1.45 is used, in some cases, the thin film formed from the resultant fluorocoating composition has a low level of antireflection effect.

The lower-refractive index layer may also be formed of a thin film of $SiO_2$. This lower-refractive index layer may be formed, for example, by vapor deposition, sputtering, or plasma CVD, or by a method in which an $SiO_2$ gel film is formed from a sol liquid containing an $SiO_2$ sol. In addition to $SiO_2$, a thin film of $MgF_2$ or other material may constitute the lower-refractive index layer. However, the use of a thin film of $SiO_2$ is preferred from the viewpoint of high adhesion to the lower layer. Among the above methods, when plasma CVD is adopted, a method is preferably adopted in which an organosiloxane is used as a starting gas and the CVD is carried out in such a state that other inorganic vapor deposition sources are not present. Further, preferably, in the CVD, the substrate is kept at the lowest possible temperature.

2. Production Process of Optical Laminate

Preparation of Composition for Each Layer

Each composition for the antistatic layer, the thin layer, the hardcoat layer and the like may be prepared according to a conventional preparation method by mixing the above-described components together and subjecting the mixture to dispersion treatment. The mixing and dispersion can be properly carried out, for example, by a paint shaker or a beads mill.

Coating

Specific examples of methods for coating each liquid composition onto a surface of the light transparent base material and a surface of the antistatic layer include various methods such as spin coating, dip coating, spraying, die coating, bar coating, roll coating, meniscus coating, flexographic printing, screen printing, and bead coating.

The curing-type resin composition may be cured by electron beam or ultraviolet light irradiation. In the case of electron beam curing, for example, electron beams having an energy of 100 KeV to 300 KeV are used. In the case of ultraviolet curing, for example, ultraviolet light emitted from ultrahigh pressure mercury lamps, high pressure mercury lamps, low pressure mercury lamps, carbon arcs, xenon arcs, metal halide lamps or the like may be used.

3. Use of Optical Laminate

The optical laminate according to the present invention as a hardcoat laminate is preferably utilized as antireflective laminates. The optical laminate according to the present invention is utilized in transmission display devices. In particular, the optical laminate according to the present invention is used for display in televisions, computers, word processors and the like, especially on display surfaces, for example, in CRTs or liquid crystal panels.

Polarizing Plate

A polarizing plate is composed mainly of a polarizing film and two protective laminates holding the polarizing film from respective both sides thereof. Preferably, the antireflection laminate according to the present invention is used in at least one of the two protective laminates holding the polarizing film from both sides thereof. When the optical laminate according to the present invention functions also as the protective laminate, the production cost of the polarizing plate can be reduced. The use of the optical laminate according to the present invention as the outermost layer can provide a polarizing plate that can prevent external light reflection and the like and, at the same time, is also excellent in scratch resistance, anti-fouling properties and the like. The polarizing film may be a conventional polarizing film or a polarizing film taken off from a continuous polarizing film of which the absorption axis of the polarizing film is neither parallel nor perpendicular to the longitudinal axis.

EXAMPLES

The present invention will be described in more detail with reference to the following Examples. However, it should be noted that the contents of the present invention should not be construed as limited to the contents of the following Examples.

Example 1

Preparation of Composition 1 for Antistatic Layer

A composition for an antistatic layer was prepared by mixing and dispersing the following ingredients according to the following formulation.

| | |
|---|---|
| Antistatic agent (ATO dispersion liquid) (tradename; ASHD300S, manufactured by The Inctec Inc.) | 5 parts by mass |
| Cyclohexanone | 22 parts by mass |
| Polymerization initiator (tradename; Irgacure184, manufactured by Ciba Specialty Chemicals, K.K.) | 0.2 part by mass |

Preparation of Composition 1 for Hardcoat Layer

A composition for a hardcoat layer was prepared by mixing and dispersing the following ingredients according to the following formulation.

| | |
|---|---|
| Pentaerythritol triacrylate (tradename; PET30, manufactured by Nippon Kayaku Co., Ltd.) | 100 parts by mass |
| Methyl ethyl ketone | 43 parts by mass |
| Leveling agent (tradename; MCF-350-5, manufactured by Dainippon Ink and Chemicals, Inc.) | 2 parts by mass |
| Polymerization initiator (tradename; Irgacure184, manufactured by Ciba Specialty Chemicals, K.K.) | 6 parts by mass |

Production of Optical Laminate

A transparent base material (an 80 μm-thick triacetylcellulose resin film (TF80UL, manufactured by Fuji Photo Film Co., Ltd.) was provided. A liquid composition 1 for an antistatic layer was coated with a wound-type coating rod onto one side of the film. The coated film was held in a hot oven of 70° C. for 30 sec to evaporate the solvent contained in the coating film. Thereafter, ultraviolet light was applied at an integrated quantity of light of 98 mj to cure the coating film and thus to form a transparent antistatic layer at a coverage of 0.7 g/cm² (on a dry basis). Thus, an optical laminate was prepared. Thereafter, a composition 1 for a hardcoat layer was coated onto the antistatic layer, followed by holding in a hot oven of 70° C. for 30 sec to evaporate the solvent in the coating film. Thereafter, ultraviolet light was applied to the coating film at an integrated quantity of light of 46 mj to cure the coating film and thus to form a transparent antistatic layer at a coverage of 15 g/cm² (on a dry basis). Thus, an optical laminate was prepared.

Example 2

Preparation of Composition 2 for Antistatic Layer

| | |
|---|---|
| Antistatic agent 2 (polythiophene dispersion liquid) (TA2010, manufactured by Idemitsu Technofine Co., Ltd.) | 10 parts by mass |
| Isopropyl alcohol | 4.95 parts by mass |
| Cyclohexanone | 0.05 part by mass |

Production of Optical Laminate

Figure 3:
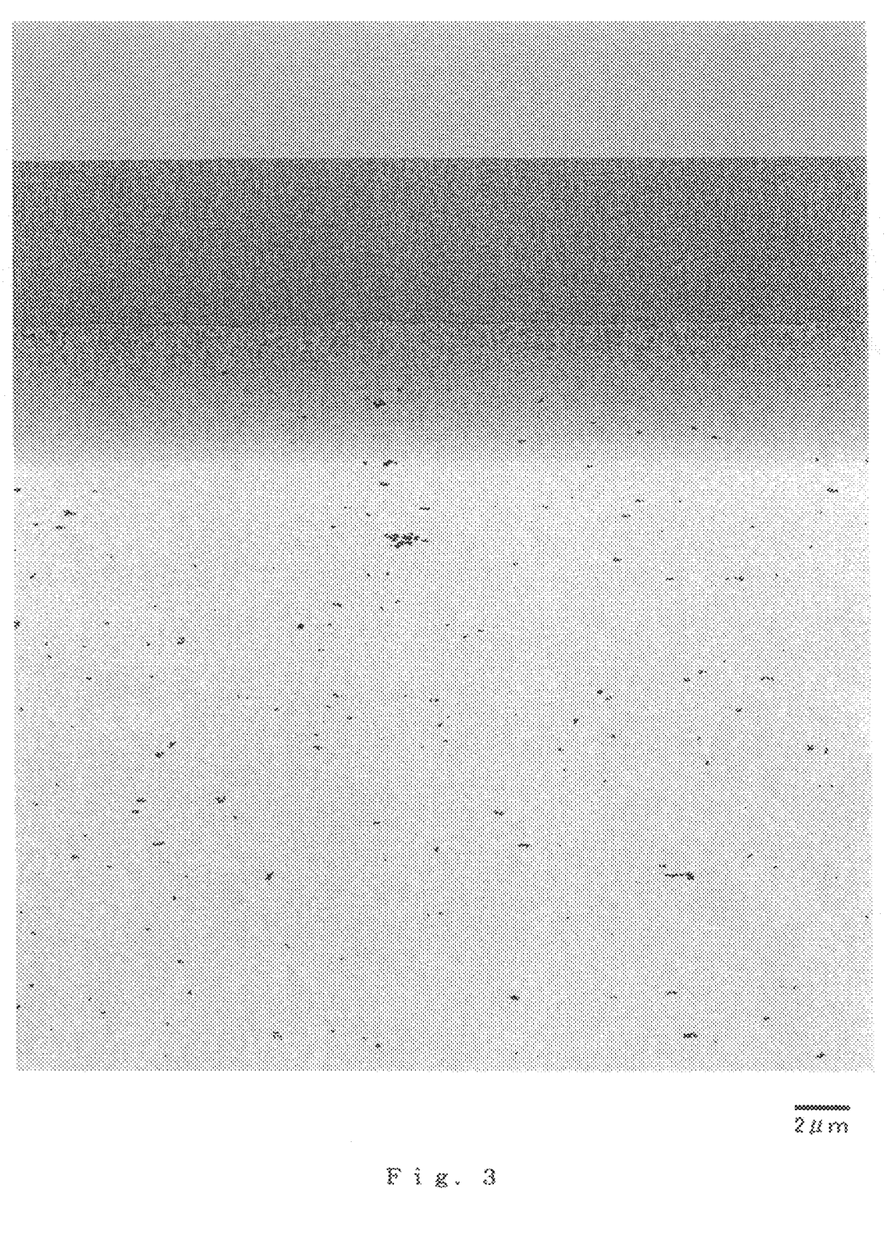
FIG. 3 is a transmission electron microphotograph of the section of an optical laminate according to the present invention (Example 2)
Figure 4:
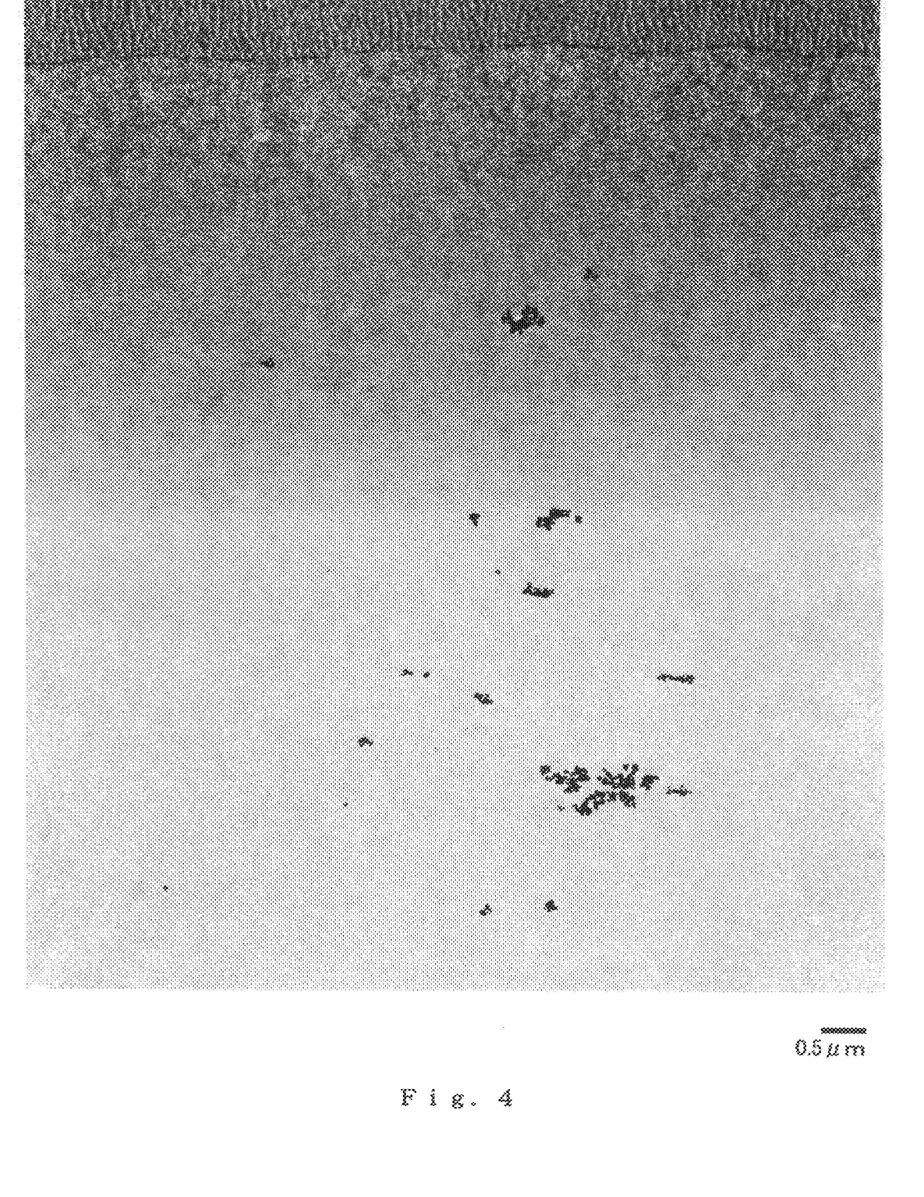
FIG. 4 is an enlarged diagram of a transmission electron microphotograph of the section of the optical laminate shown in FIG. 3.

A transparent base material (an 80 μm-thick triacetylcellulose resin film (TF80UL, manufactured by Fuji Photo Film Co., Ltd.) was provided. A liquid composition 2 for an antistatic layer was coated with a wound-type coating rod onto one side of the film. The coated film was held in a hot oven of 50° C. for 30 sec to evaporate the solvent contained in the coating film to form a transparent antistatic layer at a coverage of 0.5 g/cm² (on a dry basis). Thus, an optical laminate was prepared. Thereafter, a composition 1 for a hardcoat layer was coated onto the antistatic layer, followed by holding in a hot oven of 70° C. for 30 sec to evaporate the solvent in the coating film. Thereafter, ultraviolet light was applied to the coating film at an integrated quantity of light of 46 mj to cure the coating film and thus to form a transparent antistatic layer at a coverage of 15 g/cm² (on a dry basis). Thus, an optical laminate was prepared. The section of this optical laminate was cut with a microtome, and the cut area was observed under TEM (a transmission electron microscope). The results were as shown in FIGS. 3 and 4.

Comparative Example 1

An optical laminate was prepared in the same manner as in Example 1, except that cyclohexanone in composition 1 for an antistatic layer and methyl ethyl ketone in composition 1 for a hardcoat layer each were changed to toluene.

Comparative Example 2

An optical laminate was prepared in the same manner as in Comparative Example 1, except that the composition for an antistatic layer was changed to the following composition for a particle-containing antistatic layer.

Preparation of Composition for Particle-Containing Antistatic Layer

| | |
|---|---|
| Antistatic agent (ATO dispersion liquid) (tradename; ASHD300S, manufactured by The Inctec Inc.) | 5 parts by mass |
| Interference fringe preventive particles (silica dispersion liquid) (tradename; EXG 40-77 (D-30M), manufactured by Dainichiseika Color & Chemicals Manufacturing Co., Ltd.) | 1 part by mass |
| Toluene | 22 parts by mass |
| Polymerization initiator (tradename; Irgacure184, manufactured by Ciba Specialty Chemicals, K.K.) | 0.2 part by mass |

Comparative Example 3

An optical laminate was prepared in the same manner as in Example 2, except that the following composition 2 for a hardcoat layer was used.

Preparation of Composition 2 for Hardcoat Layer

A composition 2 for a hardcoat layer was prepared by mixing and dispersing the following ingredients according to the following formulation.

| | |
|---|---|
| Pentaerythritol triacrylate (tradename; PET30, manufactured by Nippon Kayaku Co., Ltd.) | 100 parts by mass |
| Toluene | 43 parts by mass |
| Leveling agent (tradename; MCF-350-5, manufactured by Dainippon Ink and Chemicals, Inc.) | 2 parts by mass |
| Polymerization initiator (tradename; Irgacure184, manufactured by Ciba Specialty Chemicals, K.K.) | 6 parts by mass |

Evaluation Tests

For the optical laminates prepared in the above Examples and Comparative Examples, the following evaluation tests were carried out. The results are shown in Table 1 below.

1: Total Light Transmittance

The total light transmittance (%) was measured with a haze meter (product number; HM-150, manufactured by Murakami Color Research Laboratory).

2: Haze Value

The haze value (%) was measured with a haze meter (product number; HM-150, manufactured by Murakami Color Research Laboratory).

3: Occurrence of Interference Fringes

In order to prevent backside reflection attributable to the surface of the optical laminate remote from the hardcoat layer, the surface of the optical laminate remote from the hardcoat layer was rubbed with sandpaper, and a black tape was applied thereon. An optical laminate was visually inspected from the side of the hardcoat layer with an interference fringe inspection lamp (FNA-18, manufactured by FUNATECH CO., LTD.) and a three-wavelength fluorescent lamp. The results were evaluated according to the following criteria.

Evaluation Criteria

◯: For both the interference fringe inspection lamp and the three-wavelength fluorescent lamp, interference fringes did not occur.

x: For both the interference fringe inspection lamp and the three-wavelength fluorescent lamp, interference fringes occurred.

4: Flatness of Hardcoat Layer Surface

Unevenness of a projected shadow was visually inspected by a projection exposure apparatus (USHIO Optical Modeulex, ultrahigh pressure mercury lamp inspection projection type, SX-UI501HEG), manufactured by Ushio Inc., and the results were evaluated according to the following criteria. This apparatus is in such a form that an optical laminate sample to be evaluated is placed between a light source and a white plate in the projection apparatus. When optical film thickness unevenness or deformation is present in the sample, this state is projected in an enlarged form on the white plate and thus can be visually inspected. When the sample is flat, no unevenness attributable to surface concaves and convexes is visually observed.

Evaluation Criteria

◯: Uneven state was not observed.

x: Uneven state was observed.

5: Dazzling

A transparent glass plate with a pressure-sensitive adhesive was applied to the surface of the optical laminate remote from the hardcoat layer. The surface was visually inspected through a CRT light source which emits green light at a narrow angle, and the dazzling was evaluated according to the following criteria. In observing transmitted light from within the display on the outermost surface, when the outermost surface is not flat, that is, has optical concave-convex deformation, this nonflat state causes dazzling which hinders the observation. On the other hand, when the outermost surface is flat, dazzling does not occur. This dazzling was observed as an evaluation item.

Evaluation Criteria

◯: Dazzling does not occur.

x: Dazzling occurred.

TABLE 1

| | Evaluation 1 | Evaluation 2 | Evaluation 3 | Evaluation 4 | Evaluation 5 |
|---|---|---|---|---|---|
| Ex. 1 | 90.3 | 0.4 | ◯ | ◯ | ◯ |
| Ex. 2 | 91.5 | 0.3 | ◯ | ◯ | ◯ |
| Comp. Ex. 1 | 90.3 | 0.4 | x | x | x |
| Comp. Ex. 2 | 90.2 | 0.9 | ◯ | x | x |
| Comp. Ex. 3 | 91.5 | 0.3 | x | ◯ | ◯ |

The invention claimed is:

1. An optical laminate comprising:
a light transparent base material; and
an antistatic layer and a hardcoat layer provided in that order on said light transparent base material;
wherein said antistatic layer comprises a composition for an antistatic layer comprising an organic electrically conductive composition as an antistatic agent, a resin and a penetrative solvent provided on said light transparent base material;
wherein said hardcoat layer comprises a composition for a hardcoat layer comprising a resin and a penetrative solvent provided on said antistatic layer;
wherein said organic electrically conductive composition comprises a polymer selected from the group consisting of aliphatic conjugated polyacetylenes, aromatic conjugated poly(paraphenylenes), heterocyclic conjugated polypyrroles, polythiophene, heteroatom-containing conjugated polyanilines, mixed type conjugated poly(phenylenevinylenes), double-chain conjugated systems which are conjugated systems having a plurality of conjugated chains in the molecule thereof, and electrically conductive composites which are polymers prepared by grafting or block-copolymerizing the conjugated polymer chain onto a saturated polymer;
wherein said polymer in said organic electrically conductive composition is dispersed in said light transparent base material, whereby substantially no interface is present between said antistatic layer and said light transparent base material; and
wherein said antistatic layer is a heterogeneous film having microcracks formed therein, and substantially no interface is present between said antistatic layer and said hardcoat layer.

2. The optical laminate according to claim 1, wherein an amount of said penetrative solvent in said composition for said antistatic layer added is not less than 1% by weight and not more than 50% by weight based on a total weight of said composition for said antistatic layer.

3. The optical laminate according to claim 1, wherein an amount of said penetrative solvent in said composition for said hardcoat layer added is not less than 10% by weight and not more than 90% by weight based on a total weight of said composition for said hardcoat layer.

4. The optical laminate according to claim 1, which further comprises a lower-refractive index layer on said hardcoat layer.

5. The optical laminate according to claim 1, wherein said hardcoat layer comprises at least one of an antistatic agent and an anti-dazzling agent.

6. The optical laminate according to claim 1, which is used as an antireflective laminate.

7. The optical laminate according to claim 1, which is utilized in an image display device.

8. The optical laminate according to claim 1, wherein said light transparent base material has a thickness of 30 μm to 200 μm.

9. The optical laminate according to claim 1, wherein said light transparent base material is triacetylcellulose.

* * * * *